(12) United States Patent
Liu et al.

(10) Patent No.: US 11,443,873 B2
(45) Date of Patent: Sep. 13, 2022

(54) CONDUCTIVE FILM AND MANUFACTURING METHOD THEREOF

(71) Applicant: Shine Optoelectronics (Kunshan) Co., Ltd., Kunshan (CN)

(72) Inventors: Lidong Liu, Kunshan (CN); Sheng Zhang, Kunshan (CN); Guangzhou Yang, Kunshan (CN); Shen Hong, Kunshan (CN)

(73) Assignee: SHINE OPTOELECTRONICS (KUNSHAN) CO., LTD, Kunshan (CN)

( * ) Notice: Subject to any disclaimer, the term of this patent is extended or adjusted under 35 U.S.C. 154(b) by 0 days.

(21) Appl. No.: 17/043,584

(22) PCT Filed: Apr. 11, 2019

(86) PCT No.: PCT/CN2019/082289
§ 371 (c)(1),
(2) Date: Sep. 29, 2020

(87) PCT Pub. No.: WO2019/228079
PCT Pub. Date: Dec. 5, 2019

(65) Prior Publication Data
US 2021/0027918 A1   Jan. 28, 2021

(30) Foreign Application Priority Data

May 29, 2018  (CN) .......................... 201810532534.7

(51) Int. Cl.
*H01B 5/14* (2006.01)
*H01B 13/00* (2006.01)
(52) U.S. Cl.
CPC ........... *H01B 13/0026* (2013.01); *H01B 5/14* (2013.01)

(58) Field of Classification Search
CPC .......... H01B 5/14; H01B 7/08; H05K 1/0289; H05K 1/0296
(Continued)

(56) References Cited

U.S. PATENT DOCUMENTS 6,523,252 B1 * 2/2003 Lipponen ................. H01P 3/06
  29/850
9,078,360 B2 * 7/2015 Cok ...................... H05K 3/1258
(Continued)

FOREIGN PATENT DOCUMENTS

CN      1707786 A    12/2005
CN    203179571 U     9/2013
(Continued)

OTHER PUBLICATIONS

Office Action from corresponding Chinese Application No. 201810532534.7 dated Jul. 21, 2020, 17 pages.
(Continued)

*Primary Examiner* — Chau N Nguyen
(74) *Attorney, Agent, or Firm* — Tucker Ellis LLP (57) ABSTRACT

Disclosed is an electrically-conductive film, comprising a support layer, an electrically-conductive area, a lead, and a bridging part. The support layer comprises a first side and a second side in an opposite arrangement. The support layer is recessively provided with a first groove and a second groove not in communication with each other. The first groove is filled with an electrically-conductive material to form an electrically-conductive area. The second groove is filled with an electrically-conductive material to form a lead. The bridging part is provided on the first side; the bridging part is electrically connected to the electrically-conductive area and to the lead. With the bridging part connected to the electrically-conductive area and to the lead, the connection is of increased reliability, and the electrical conductivity is
(Continued)

increased. In addition, also disclosed is a preparation method for the electrically-conductive film.

13 Claims, 8 Drawing Sheets

(58) Field of Classification Search
USPC .................................................. 174/117 F, 261
See application file for complete search history.

(56) References Cited

U.S. PATENT DOCUMENTS

| | | | | |
|---|---|---|---|---|
| 9,832,881 | B2* | 11/2017 | Chung | ............... H05K 3/103 |
| 2006/0157766 | A1 | 7/2006 | Won et al. | |
| 2009/0314525 | A1* | 12/2009 | Kajino | ............... H05K 1/0265 |
| | | | | 29/874 |
| 2013/0207911 | A1* | 8/2013 | Barton | ............... G06F 3/0446 |
| | | | | 345/173 |
| 2015/0060112 | A1* | 3/2015 | Cok | ............... H01L 51/5212 |
| | | | | 174/253 |

FOREIGN PATENT DOCUMENTS

| | | | |
|---|---|---|---|
| CN | 103426504 | A | 12/2013 |
| CN | 203376990 | U | 1/2014 |
| CN | 104347155 | A | 2/2015 |
| CN | 204155250 | U | 2/2015 |
| CN | 204515751 | U | 7/2015 |
| CN | 105448423 | A | 3/2016 |
| CN | 106155381 | A | 11/2016 |
| CN | 206400520 | U | 8/2017 |
| CN | 107153486 | A | 9/2017 |
| CN | 107369491 | A | 11/2017 |
| CN | 208444611 | U | 1/2019 |
| CN | 208444612 | U | 1/2019 |
| JP | 2012182490 | A | 9/2012 |
| KR | 20160120913 | A | 10/2016 |

OTHER PUBLICATIONS

International Search Report from corresponding International Application No. PCT/CN2019/082289, dated Jul. 12, 2019, 5 pages including translation.

* cited by examiner

CONDUCTIVE FILM AND MANUFACTURING METHOD THEREOF

The present application claims the benefit of priority to Chinese Patent Disclosure No. 201810532534.7, entitled "CONDUCTIVE FILM AND MANUFACTURING METHOD THEREOF" and filed on May 29, 2018, the content of which is incorporated herein by reference in its entirety.

TECHNICAL FIELD

The present disclosure relates to electronic technology, and particularly, to a conductive film and a manufacturing method thereof.

BACKGROUND

The transparent conductive film is a conductive film, which has high conductivity, excellent transparency to visible light and a wide range of disclosure prospects, having wide application prospect. In recent years, it has been successfully applied in various fields, such as liquid crystal displays, touch panels, electromagnetic wave protection, transparent electrodes of solar cells, transparent surface heaters and flexible light-emitting devices.

The conventional touch screens typically employs a conductive layer of indium tin oxide (ITO). In the manufacturing process of the ITO layer, it is inevitable to coat and pattern films, in order to manufacture the electrode silver leads. In addition, the ITO film is required to be etched when the ITO is patterned. Such a conventional manufacturing process is complicated and lengthy, resulting in a poor conductivity of the conductive layer and a low yield rate. In addition, such a manufacturing process raises high requirements on technology and equipment, a large amount of ITO materials is wasted during the etching, and a large amount of industrial waste liquid containing heavy metals is produced.

With the development of metal grid conductive film technology, the aforementioned defects are cured. The metal grid conductive film generally is provide with a grid shape and includes a visible region and a lead region. In order to ensure the transmittance of the visible region, a relatively small grid-like design is generally employed, but such grid lines has a not high conductivity in the lead region.

In view of the above, in the present disclosure, the existing technical problems are solved by modifying the conductive film.

SUMMARY

Based on this, it is necessary to provide a conductive film to solve the above technical problems.

The technical solution of the present disclosure is as follows.

A conductive film comprises: a carrier layer comprising a first side surface and a second side surface that are opposite to each other, wherein the first side surface of the carrier layer is recessed to form at least one first groove and at least one second groove that are not in communication with each other; at least one conductive section formed by a conductive material filled in the at least one first groove; at least one lead formed by a conductive material filled in the at least one second groove; and at least one bridging portion arranged on the first side surface and each configured to electrically connect one of the at least one conductive section with one of the at least one lead.

The present disclosure also provides manufacturing method of a conductive film, comprising: step S1 of forming a carrier layer by embossing an adhesive, and embossing a first side surface of the carrier layer to form at least one first groove and at least one second groove that are not in communication with each other; step S2 of filling the at least one first groove and the at least one second groove with conductive materials to form at least one conductive section and at least one lead, respectively; and step S3 of forming at least one bridging portion on the first side surface, two ends of each of the at least one bridging portion being electrically connected a corresponding one of the at least one conductive section and a corresponding one of the at least one lead, respectively.

In an embodiment, the bridging portion is formed by silk screen printing, inkjet printing, sputtering or evaporation.

In an embodiment, the bridging portion is silk screen-printed in a dot, line, surface, block, strip or grid shape.

A manufacturing method of a conductive film includes: step S1 of forming a carrier layer by embossing an adhesive, and embossing a first side surface of the carrier layer to form a plurality of first grooves and a plurality of second grooves that are not in communication with each other; step S2 of filling the plurality of first grooves with a conductive material to form a plurality of conductive sections extending vertically and a plurality of conductive sections extending horizontally, each of the plurality of conductive sections extending horizontally being disconnected at positions where the conductive section extending horizontally intersects the plurality of conductive sections extending vertically; and filling the plurality of second grooves with a conductive material to form a plurality of leads; step S3 of providing insulating portions distributed and covering the positions where the plurality of conductive sections extending vertically intersects the plurality of conductive sections extending horizontally; and step S4 of forming a plurality of bridging portions on the first side surface, two ends of each of the plurality of bridging portions being electrically connected to one of the plurality of leads and one of the plurality of conductive sections, respectively; and forming second bridging portions on the insulating portions, the second bridging portions electrically connecting the disconnected portions of the plurality of conductive sections extending horizontally.

In an embodiment, the at least one bridging portion is formed on the first side surface by silk screen printing, inkjet printing, sputtering or evaporation.

The present disclosure has the following beneficial effects: in the conductive film, the conductive section and the lead are connected by the bridging portion and such connection is more reliable and increases conductive performance, and the process thereof is simple and environmentally friendly.

DESCRIPTION OF EMBODIMENTS

In order to facilitate the understanding of the present disclosure, the present disclosure is be described in a more comprehensive manner with reference to the related drawings. The preferred embodiments of the present disclosure are illustrated in the drawings. However, the present disclosure can be implemented in many different manners and is not limited to the embodiments described below. On the contrary, these embodiments are provided to explain the present disclosure more thoroughly and comprehensively.

It should be noted that when an element is referred to as being "disposed on" another element, it can be directly arranged on another element or an intermediate element can also be provided therebetween. When an element is regarded as being "connected to" another element, it can be directly connected to another element or an intermediate element can be provided therebetween at the same time. The terms "vertically", "horizontal", "left", "right" and other similar expressions used herein are merely for illustrative purposes but do exclude other implementations.

Unless otherwise defined, all technical and scientific terms used herein have the same meaning that those skilled can understand in the technical field of the present disclosure. The terms used in the specification of the present disclosure herein is only for the purpose of describing specific embodiments, but not intended to limit the present disclosure. The term "and/or" as used herein includes any and all combinations of one or more related listed items.

The present disclose provides a conductive film, including a carrier layer, a conductive section, a lead, and a bridging portion. The carrier layer includes a first side surface and a second side surface that are opposite to each other, and the first side surface of the carrier layer is recessed to form a first groove and a second groove that are not in communication to each other. The first groove is filled with a conductive material to form a conductive section. The second groove is filled with a conductive material to form a lead. The bridging portion is arranged on the first side surface and electrically connected to both the conductive section and the lead. By connecting the conductive section to the lead with the bridging portion, the connection is more reliable and increases the conductivity. At the same time, the first groove and the second groove can be formed by embossing at the same time, and then the bridging portion is provided on the first side surface by printing or the like, to electrically connect the conductive section to the lead. Such a process is environmentally friendly and low cost.

Specifically, the bridging portion is formed on the first side surface by silk screen printing, inkjet printing, sputtering evaporating, or the like. In the process of forming the bridging portion, precise positioning is not required, and the process is simple and reliable. The bridging portion has a height selected from a range from 0.5 μm to 1000 μm.

Specifically, the bridging portion includes a bottom surface facing towards the first side surface, and the bottom surface is in a partial contact with the first side surface. The bridging portion is stacked on the carrier layer, and the bottom surface of the bridging portion is in contact with the first side surface. A part of the bottom surface is in contact with the conductive section, a part of the bottom surface is in contact with the first side surface, and a part of the bottom surface is in contact with the lead.

Specifically, the bridging portion is electrically connected to the conductive section through at least one of a point-to-point connection, a point-to-line connection, a point-to-surface connection, a line-to-line connection, a line-to-surface connection, or a surface-to-surface connection; and the bridging portion is electrically connected to the lead through at least one of a point-to-point connection, a point-to-line connection, a point-to-surface connection, a line-to-line connection, a line-to-surface connection, or a surface-to-surface connection. For example, a point of the conductive section abuts against a point of the bridging portion; several points of the conductive section abut against a surface of the bridging portion; an edge line of the lead intersects an edge line of the bridging portion; the edge line of the lead is in contact with a surface of the bridging portion; a surface of the lead is in contact with a surface of the bridging portion; a convex surface of the conductive section matches and is contact with a concave surface of the bridging portion; and so on. The edge line of the bridging portion is in contact with the edge line of the conductive section, and the bridging portion and the conductive section are overlapped and in contact with each other.

Preferably, the conductive section includes a first top surface opposite to the bottom of the first groove, the lead includes a second top surface opposite to the bottom of the second groove, and the bridging portion includes a bottom surface facing towards the first side surface, and the bottom surface is in contact with both the first top surface and the second top surface.

Preferably, a height of the bridging portion is smaller than a height of the conductive section, and a height of the conductive section is smaller than a height of the lead; or the height of the bridging portion is smaller than the height of the conductive section and the height of the conductive section is the same as the height of the lead; or the height of the conductive section is smaller than the height of the bridging portion, and the height of the bridging portion is smaller than the height of the lead.

Preferably, a width of the first groove is greater than a width of the second groove. That is, a width of the conductive section is greater than a width of the lead. A depth of the second groove is greater than a depth of the first groove, i.e., a thickness of the lead is greater than a thickness of the conductive section, thereby ensuring the conductivity of the lead.

Preferably, a cross section of the first groove is trapezoidal, and an opening of the first groove located on the first side has a greater width than a bottom of the first groove; and/or a cross section of the second groove is trapezoidal, and an opening of the second groove located on the first side has a greater width than a bottom of the second groove. The first groove and the second groove in a shape of inverted trapezoid can be easily demolded after the embossing.

Preferably, the first groove includes a first bottom wall and two first side walls that are connected to two sides of the first bottom wall, at least one of the first bottom wall and the two first side walls is an arcuate wall; and/or, the second groove includes a second bottom wall and two second side walls that are connected to two sides of the second bottom wall, and at least one of the second bottom wall and the two second side walls is an arcuate wall. The arcuate wall is easy to be formed and facilities the demolding.

Preferably, the conductive section includes first grids that are connected to each other, the lead includes second grids that are connected to each other, and the bridging portion electrically connects the first grid and the second grid. The first grids that are connected to each other form the conductive section, and the second grids that are connected to each other form the leads. The bridging portion connects multiple first grids and multiple second grids to ensure that the first grid and the second grid are electrically connected to each other and have excellent conductivity, which does not require strict alignment when forming the bridging portion with a process, e.g., silk screen printing, and makes the process simple. A width of a grid line of the first grid is greater than a width of a grid line of the second grid. A grid density of the first grid is smaller than a grid density of the second grid.

Preferably, the bridging portion can be formed by silk screen printing in various shapes such as dot, line, plane, block, strip, or grid, in order to adapt to the first grid and the second grid. The first grid and the second grid are respectively located in the first groove and the second groove. That is, the first grid and the second grid are located at a lower side of a plane of the first side, and the bridging portion is located at an upper side of the plane of the first side, such that the bridging portion can be varied in terms of its shape and size, so as to be adapted to various scenarios.

Preferably, the bridging portion includes a plurality of connection points, and each of the plurality of connection points connects at least one grid line of one of the first grids with at least one grid line of one of the second grids.

Preferably, the bridging portion is linear, grid lines of the first grids extend to the bridging portion, and grid lines of second grids extend to the bridging portion.

Preferably, the bridging portion is block-shaped, and the block-shaped bridging portion partially covers the grid lines of the first grid and partially covers the grid lines of the second grid.

Preferably, the bridging portion includes third grids, the third grids extend to the first grids and are in electrical contact with the first grids, and the third grids extend to the second grids and are in electrical contact with the second grids.

Preferably, the bridging portion includes a plurality of strip-shaped bridging portions, and one end of each of the plurality of strip-shaped bridging portions is connected to one of the first grids and the other end of the strip-shaped bridging portion is connected to one of the second grids.

When the bridging portion is in a small-width shape such as point, line, grid, etc., it can be in contact with the conductive grid with a larger area, especially when the conductive grid is located in a visible region, the bridging portion dose not affect a visualized effect and a better electrical connection can be achieved.

In other embodiments, the conductive section includes first grids that are connected to each other. The lead is not in a grid-like form, but a solid line. A width of the grid line of the conductive section is smaller than a width of the solid line of the lead.

Preferably, the conductive film includes a plurality of conductive sections that are not connected to each other, and each conductive section is electrically connected to a lead through the bridging portion. The first grid of each conductive section is electrically connected to the second grid of the lead through the bridging portion. The conductive film can further include a color matching line located between two adjacent conductive sections. The color matching line can be formed by forming a third groove on the first side surface and then filling a color matching material. The color matching line can also be one of the conductive sections, but this conductive section is not connected to the lead.

Preferably, the conductive film includes a plurality of conductive sections extending vertically and a plurality of conductive sections extending horizontally, and each the plurality of conductive sections extending horizontally is disconnected at positions where the conductive section extending horizontally intersects the plurality of conductive sections extending vertically, and the disconnected portions of each of the plurality of conductive sections extending horizontally are electrically connected to each other via a second bridging portion. That is, the conductive film of the touch screen is formed by a bridging manner.

The present disclosure also provides a manufacturing method of a conductive film. The manufacturing method of the conductive film includes the following steps:

Step S1 of forming a carrier layer by embossing an adhesive, and embossing a first side surface of the carrier layer to form at least one first groove and at least one second groove that are not in communication with each other;

Step S2 of filling the first groove and the second groove with conductive materials to form a conductive section and a lead, respectively; and Step S3 of forming a bridging portion on the first side surface, two ends of the bridging portion being electrically connected to the conductive section and the lead, respectively.

The bridging portion is formed by silk screen printing, inkjet printing, sputtering or evaporation.

The conductive section and the lead can be formed at the same time by one step of embossing process and filling, and then the bridging portion only needs to connect the conductive section with the lead, without requiring strict alignment. The process is simple and pollution-free, and low cost.

The bridging portion is formed in a shape of dot, line, surface, block, strip or grid by the silk screen printing.

Another manufacturing method of a conductive film includes:

Step S1 of forming a carrier layer by embossing an adhesive, and embossing a first side surface of the carrier layer to form a plurality of first grooves and a plurality of second grooves that are not in communication with each other;

Step S2 of filling the plurality of first grooves with a conductive material to form a plurality of conductive sections extending vertically and a plurality of conductive sections extending horizontally, each of the plurality of conductive sections extending horizontally being disconnected at positions where the conductive section extending horizontally intersects the plurality of conductive sections extending vertically; and filling the plurality of second grooves with a conductive material to form a plurality of leads;

Step S3 of providing insulating portions distributed and covering the positions where the plurality of conductive sections extending vertically intersects the plurality of conductive sections extending horizontally; and Step S4 of forming a plurality of bridging portions on the first side surface, two ends of each of the plurality of bridging portions being electrically connected to one of the plurality of leads and one of the plurality of conductive sections, respectively; and forming second bridging portions on the insulating portions, the second bridging portions electrically connecting the disconnected portions of the plurality of conductive sections extending horizontally.

The bridging portion and the second bridging portion are formed by silk screen printing, inkjet printing, sputtering or evaporation.

With reference to the attached drawings, the present disclosure is illustrated by through examples.

Figure 1:
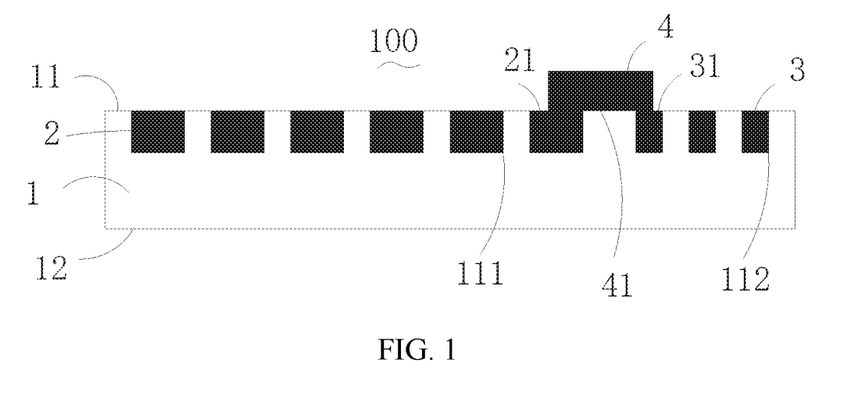
FIG. 1 is a cross-sectional view of a conductive film of the present disclosure.

With reference to FIG. 1, the present disclosure provides a conductive film 100, which includes a carrier layer 1, a conductive section 2, a lead 3 and a bonding portion 4. The carrier layer 1 includes a first side surface 11 and a second side surface 12 that are opposite to each other. The first side surface 11 of the carrier layer 1 is recessed to form a first groove 111 and a second groove 112 that are not in communication with each other. The first groove 111 is filled with a conductive material to form the conductive section 2. The second groove 112 is filled with a conductive material to form the lead 3. The bridging portion 4 is disposed on the first side surface 11, and the bridging portion 4 is electrically connected the conductive section 2 with the lead 3. The filled conductive material is selected from a group consisting of conductive materials such as graphene, conductive carbon, metal, metal oxide, and combinations thereof. The metal includes gold, silver, copper, aluminum, nickel, zinc, or alloys of any two or more thereof.

The bridging portion 4 is formed on the first side surface 11 by means of silk screen printing, inkjet printing, sputtering or evaporation. That is, the bridging portion 4 is in electrical contact with both the conductive section 2 and the lead 3 and it is located in a different layer from the conductive section 2 and the lead 3. The bridging portion 4 is stacked on the carrier layer 1, the bridging portion 4 has a bottom surface 41 in contact with the first side surface 11. A part of the bottom surface 41 contacts the conductive section 2, a part of the bottom surface 41 contacts the first side surface 11, and a part of the bottom surface 41 contacts the lead 3. Specifically, the conductive section 2 includes a first top surface 21 opposite to a bottom of the first groove. The lead 3 includes a second top surface 31 opposite to a bottom of the second groove. The bridging portion 4 includes a bottom surface 41 facing towards the first side surface 11. The bottom surface 41 is in contact with the first top surface 21, the second top surface 31 and the first side surface 11. In this embodiment, the first groove 111 and the second groove 112 are filled with the conductive material in such a manner that the first top surface 21, the second top surface 31 and the first side surface 11 are all located in a same plane. In other embodiments, the first groove 111 and the second groove 112 are not filled with conductive material such that the first top surface 21 and the second top surface 31 are lower than the first side surface 11; or they are excessively filled in such a manner that the first top surface 21 and the second top surface 31 are higher than the first side surface 11, and the bottom surface 41 is uneven. In other embodiments, the first top surface 21 and the second top surface 31 are not flat due to the processing, but are uneven, and the bottom surface 41 is also uneven accordingly.

Figure 2:
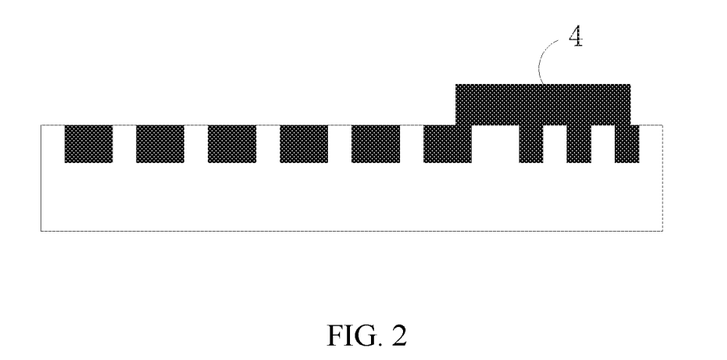
FIG. 2 is another cross-sectional view of a conductive film of the present disclosure.

The conductive section 2 and the lead 3 are simultaneously embossed and filled, and the bridging portion 4 is silk screen-printed and formed without using the electroplating process, which is environmental friendly and safe, simple in process and produces excellent conductivity. Moreover, the bridging portion 4 connects the conductive section 2 with the lead 3, as long as an electrical connection is formed between the conductive section 2 and the lead wire 3. Therefore, an alignment of the mask during silk screen printing is less strictly required, thereby simplifying the process. As shown in FIG. 2, a size and a position of the bridging portion 4 are not strictly limited (for convenience of describing and understanding, the same features in different embodiments are denoted with the same reference signs, the same as below).

A width of the first groove 111 is greater than a width of the second groove 112, that is, a width of the conductive section is greater than a width of the lead 3.

Figure 3:
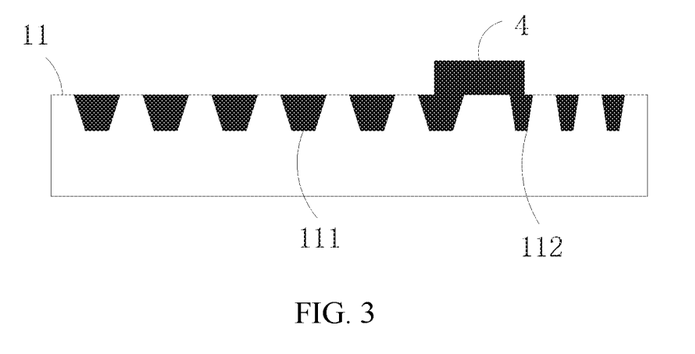
FIG. 3 is yet another cross-sectional view of a conductive film of the present disclosure.

With reference to FIG. 3, a cross section of the first groove 111 has a shape of trapezoid, and a width of an opening of the first groove 111 on the first side surface 11 is greater than a width of the bottom of the first groove 111. A cross section of the second groove 112 a shape of trapezoid, and a width of an opening of the second groove 112 on the first side surface 11 is greater than a width of the bottom of the second groove 112. That is, the trapezoid is an inverted trapezoid with a wide top and a narrow bottom. The demolding is relatively easy when embossing the first groove 111 and the second groove 112 in the shape of inverted trapezoid shape.

Figure 4:
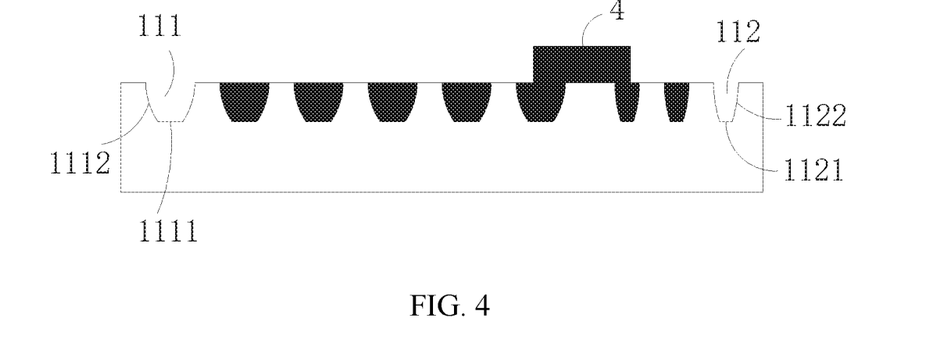
FIG. 4 is yet another cross-sectional view of a conductive film of the present disclosure.

The trapezoid can also be approximately trapezoidal. With reference to FIG. 4, in which one first groove 111 is not filled with material for clearly illustrating the structure of the first groove 111, the first groove 111 includes a first bottom wall 1111 and two first side walls 1112, and the two first side walls 1112 are arcuate walls 1112. Further with reference to FIG. 4, in which one second groove 112 is not filled with material for clearly illustrating the structure of the second groove 112, the second groove 112 includes a second bottom wall 1121 and two second side walls 1122 respectively connected both sides of the second bottom wall 1121, and the two second side walls 1122 are arcuate walls 1112. The arcuate wall is easy to form and facilities the demolding.

Figure 5:
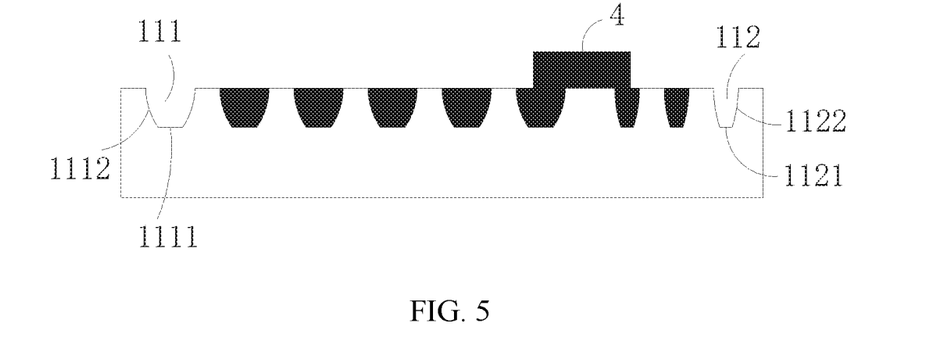
FIG. 5 is yet another cross-sectional view of a conductive film of the present disclosure.

With reference to FIG. 5, a depth of the second groove 112 is greater than a depth of the first groove 111, i.e., a thickness of the lead 3 is greater than a thickness of the conductive section 2, which guarantees the conductivity of the lead, especially in a case where the width of the groove 111 is greater than the width of the second groove 112.

Figure 6:
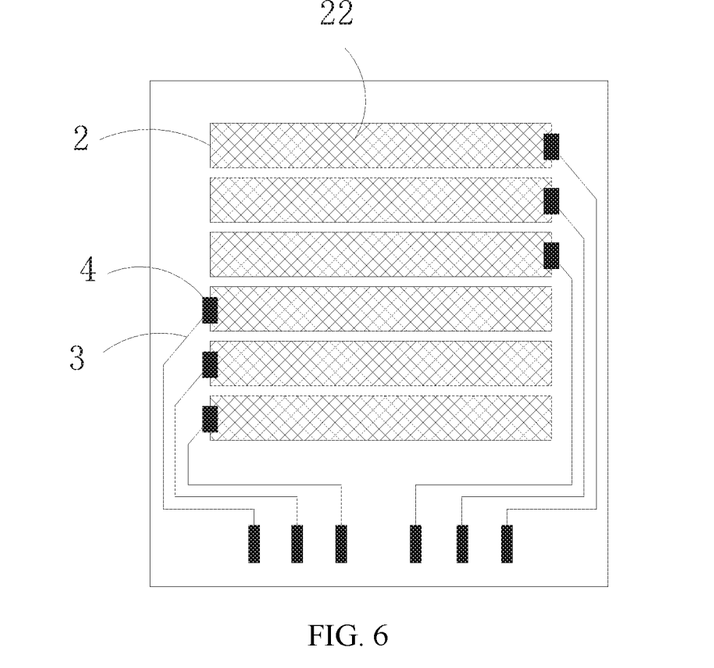
FIG. 6 is a plan view of a conductive film of the present disclosure.

In an embodiment, referring to FIG. 6, the conductive section 2 includes first grids 22 that are connected to each other, the lead includes second grids 32 that are connected to each other (see FIG. 7a), and the bridging portion 4 electrically connects the first grid 22 with the second grid 32. The conductive section 2 is formed by the first grids 22 that are connected to each other, the second grids 32 that are connected to each other form the leads 3, and the bridging portion 4 connects the first grids 22 and the second grids 32 to ensure an electrical connection between the first grid 22 and the second grid 32 and the excellent electrical conductivity.

Figure 7A:
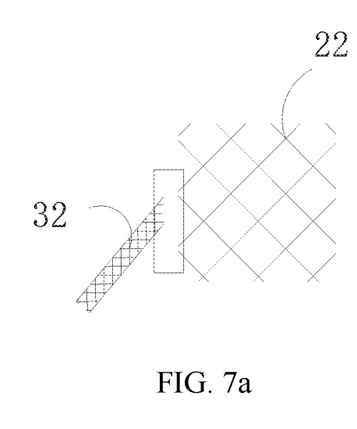
FIG. 7a to FIG. 7b are partially enlarged schematic diagrams of a conductive film of the present disclosure.
Figure 7B:
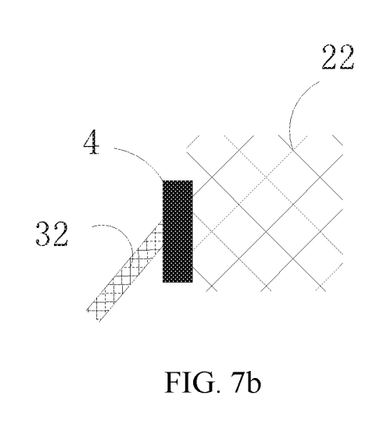
Figure 8A:
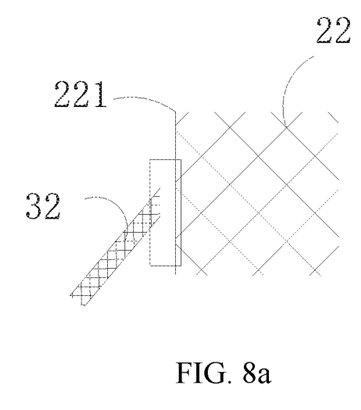
FIG. 8a to FIG. 8b are other partial enlarged schematic diagrams of a conductive film of the present disclosure.
Figure 8B:
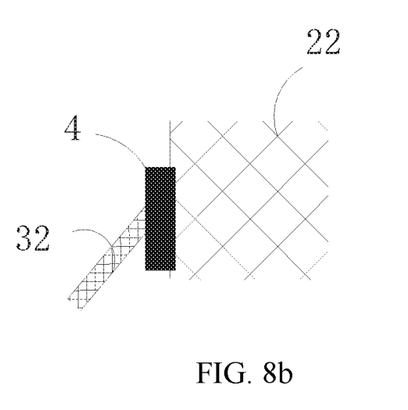
Figure 9A:
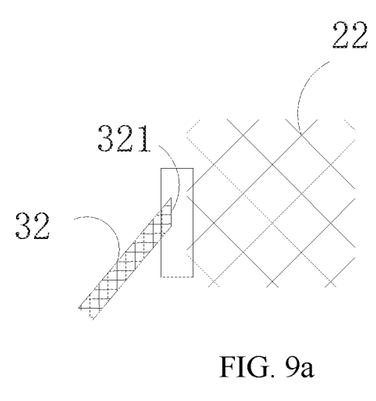
FIG. 9a to FIG. 9b are other partial enlarged schematic diagrams of a conductive film of the present disclosure.
Figure 9B:
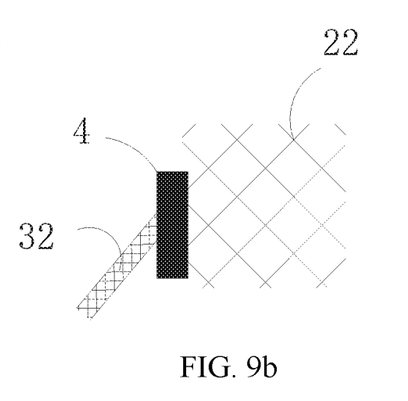
Figure 10A:
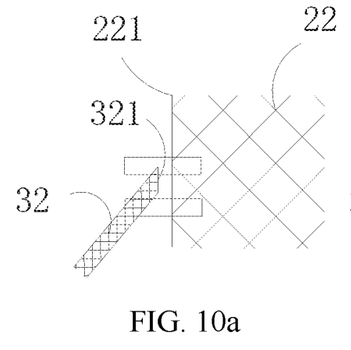
FIG. 10a to FIG. 10b are other partial enlarged schematic diagrams of a conductive film of the present disclosure.
Figure 10B:
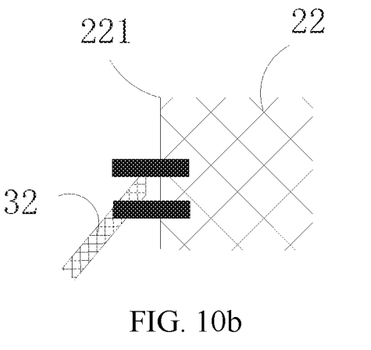

FIG. 7a to FIG. 10b are partial enlarged diagrams of a connecting position where the bridging portion 4 is connected to the first grids 22 and the second grids 32. In FIG. 7a, FIG. 8a, FIG. 9a and FIG. 10a, a frame located between the first grids 22 and the second grids 32 indicates an area where the bridging portion 4 is located, the positional relationship and connection relationship thereof is obvious. FIG. 7b, FIG. 8b, FIG. 9b, and FIG. 10b are schematic diagrams after the bridging portion 4 is provided. It can be seen from FIG. 7a to FIG. 10b that the bridging portion 4 can cover several first grids 22 and several second grids 32 to ensure electrical connection. In addition, a grid line of the first grid 22 has a greater width than a grid line of the second grid 32, and a grid density of the first grids 22 is smaller than a grid density of the second grids 32. As shown in FIG. 7a, the first grids 22 and the second grids 32 are not be provided with an edge line. As shown in FIG. 8a, the first grids 22 are provided with edge line 221 and the second grids 32 are not provided with an edge line. As shown in FIG. 9a, the first grids 22 are not provided with an edge line, and the second grids 32 are provided with an edge line 321. As shown in FIG. 10a, the first girds 22 are provided with the edge line 221 and the second grid 32 is provided with the edge line 321. The bridging portion 4 is also not limited in terms of its shape, angle and position, and it can be arranged vertically as shown in FIG. 7b or arranged horizontally as shown in FIG. 10b.

The bridging portion 4 can be silk screen-printed in various shapes such as dot, line, plane, block, strip, or grid. Specifically, FIG. 11 to FIG. 16 illustrate the shapes of the bridging portion.

Figure 11:
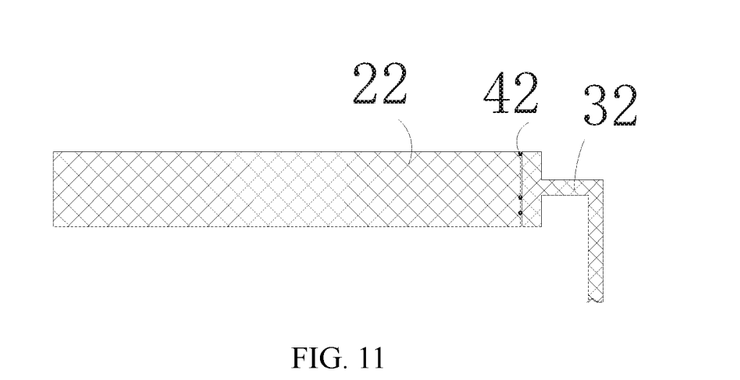
FIG. 11 is another partial enlarged schematic diagram of a conductive film of the present disclosure.

Referring to FIG. 11, the bridging portion 4 includes a plurality of connection points 42, and the connection point 42 connects at least one grid line of the first grid 22 and at least one grid line of the second grid 32.

Figure 12:
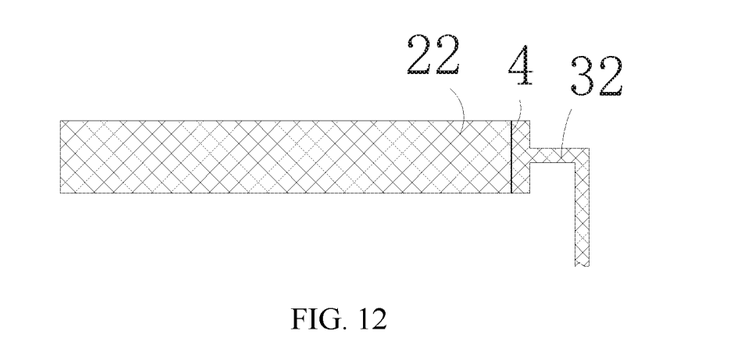
FIG. 12 is another partial enlarged schematic diagram of a conductive film of the present disclosure.

Referring to FIG. 12, the bridging portion 4 is linear, the grid lines of the first grids 22 extend to the bridging portion 4, and the grid lines of the second grids 32 extend to the bridging portion 4.

Figure 13:
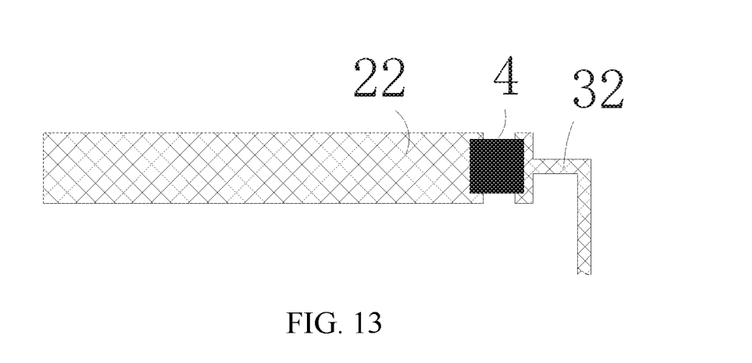
FIG. 13 is another partial enlarged schematic diagram of a conductive film of the present disclosure.

Referring to FIG. 13, the bridging portion 4 is block-shaped, and the block-shaped bridging portion 4 partially covers the grid lines of the first grid 22 and partially covers the grid lines of the second grid 32.

Figure 14:
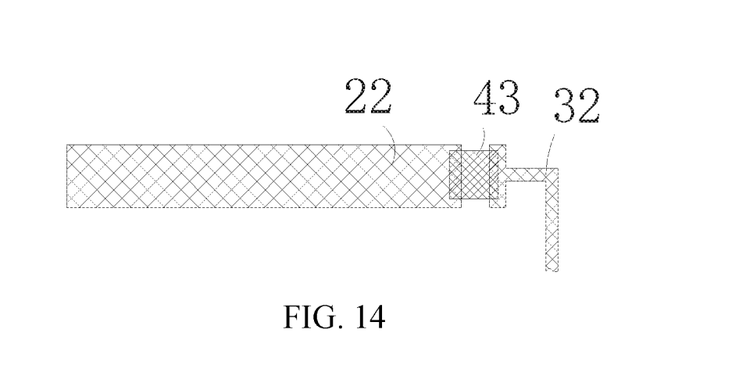
FIG. 14 is another partial enlarged schematic diagram of a conductive film of the present disclosure.

Referring to FIG. 14, the bridging portion 4 includes third grids 43, the third grids 43 extend to the first grids 22 and are in an electrical contact with the first grid 22, and the third grids 43 extend to the second grids 32 and are in an electrical contact with the second grids 32.

Figure 15:
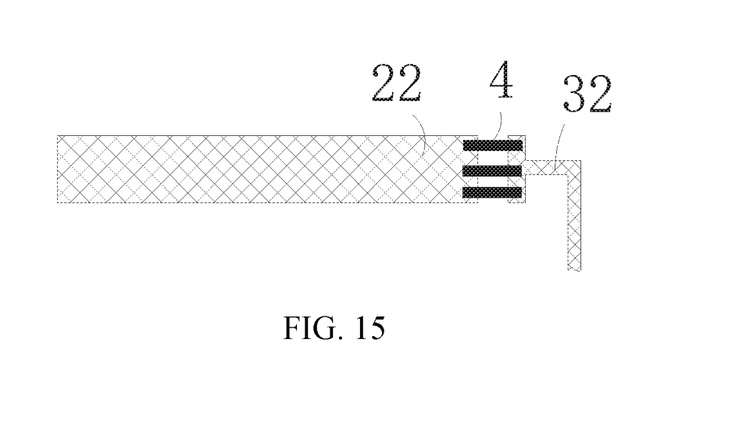
FIG. 15 is another partial enlarged schematic diagram of a conductive film of the present disclosure.

Referring to FIG. 15, a plurality of strip-shaped bridging portions is provided, and one end of each bridging portion 4 is connected to the first grid 22 and the other end thereof is connected to the second grid 32.

Figure 16:
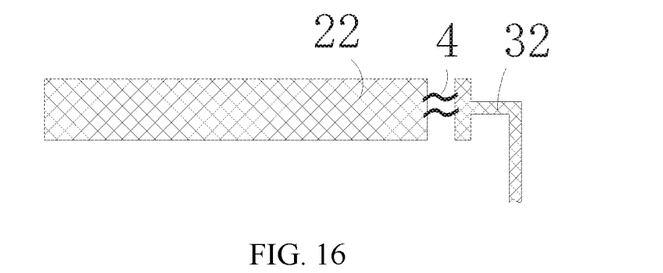
FIG. 16 is another partial enlarged schematic diagram of a conductive film of the present disclosure.

Referring to FIG. 16, the bridging portions 4 are a plurality of curved bridging portions. One end of each curved bridging portion 4 is connected to the first grid 22 and the other end thereof is connected to the second grid 32.

Figure 17A:
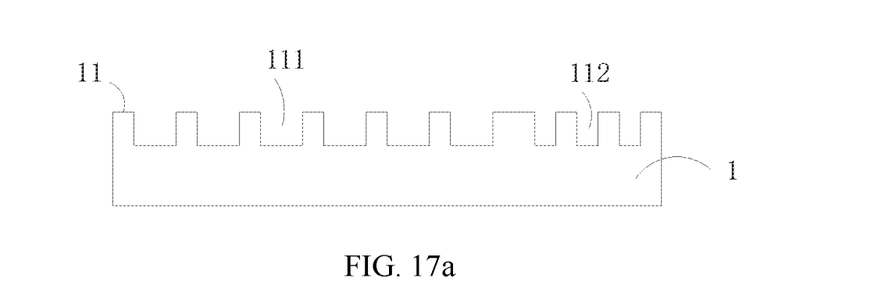
FIG. 17a to FIG. 17c are schematic diagrams of steps of a manufacturing method of a conductive film of the present disclosure.
Figure 17B:
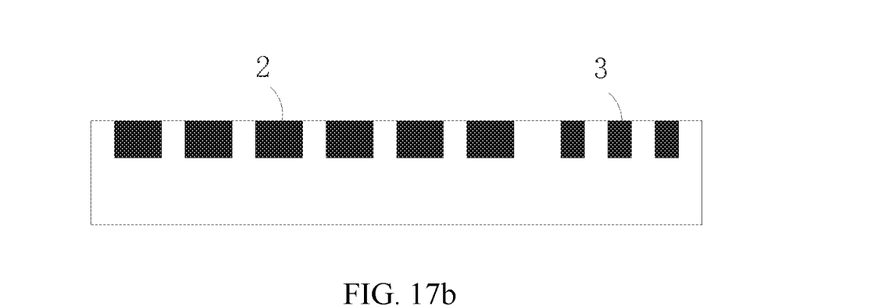
Figure 17C:
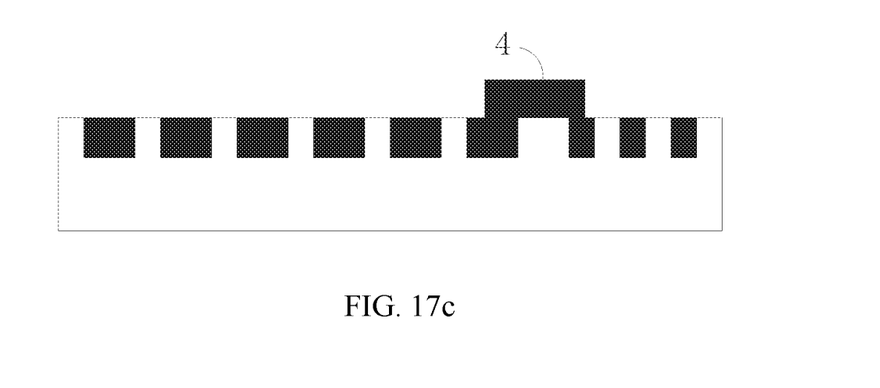

FIG. 17a to FIG. 17c illustrate an embodiment of a manufacturing method of a conductive film of the present disclosure.

The manufacturing method of the conductive film includes the following steps:

Referring to FIG. 17a, at step S1, the carrier layer 1 is formed by embossing adhesive, and first grooves 111 and second grooves 112 are formed on the first side surface 11 of the carrier layer 1 by the embossing, the first grooves 111 are not in communication with the second grooves 112.

Referring to FIG. 17b, at step S2, each of the first grooves 111 is filled with a conductive material to form a conductive section 2, and each of the second grooves is filled with a conductive material to form a lead 3.

Referring to FIG. 17c, at step S3, a bridging portion 4 is formed on the first side surface 11 through a silk screen printing, and the bridging portion 4 is electrically connected the conductive section 2 with the lead 3.

The first groove 111 and the second groove 112 can be embossed and formed at one time, or can be filled with conductive material only once to form the conductive section 2 and the lead 3.

Besides the silk screen printing, the bridging portion 4 can be also formed using sputtering, evaporation, inkjet printing, etc.

Figure 18A:
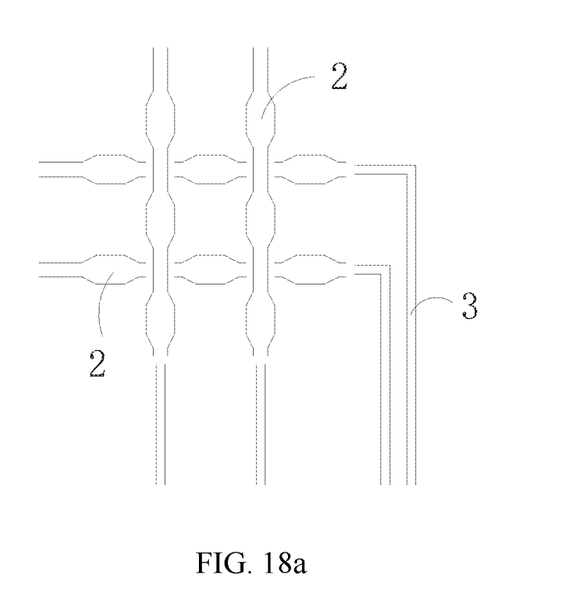
FIG. 18a to FIG. 18c are schematic diagrams of steps of a manufacturing method of a conductive film of the present disclosure.
Figure 18B:
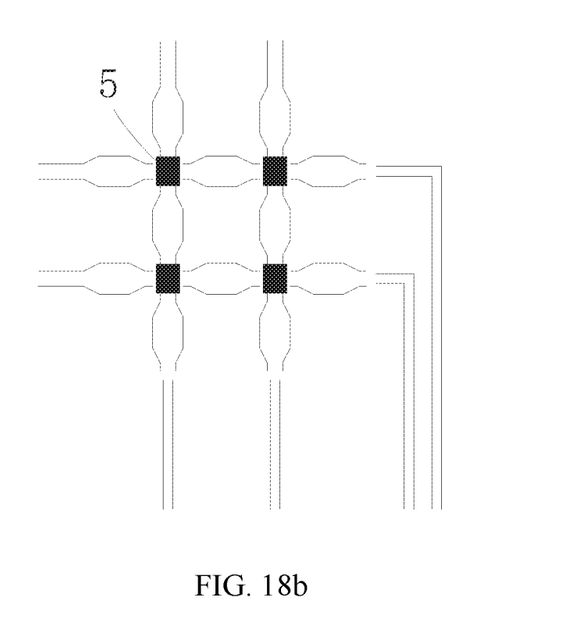
Figure 18C:
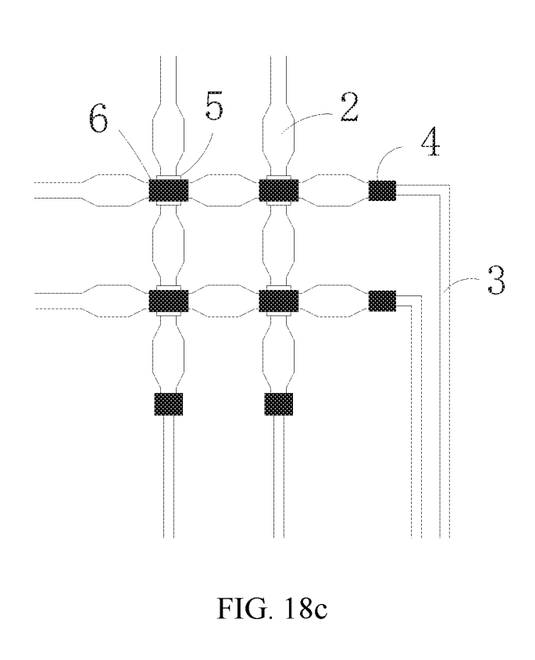

FIG. 18a to FIG. 18c illustrate another manufacturing method of a conductive film of the present disclosure, and the manufacturing method includes the following steps:

Step S1, forming a carrier layer by embossing an adhesive, and forming first grooves and second grooves on the first side surface of the carrier layer 1 by the embossing, the first grooves being not in communication with the second grooves;

Step S2, referring to FIG. 18a, filling the first groove with the conductive material to form a plurality of conductive sections extending vertically and a plurality of conductive sections 2 extending horizontally, the conductive section extending horizontally being disconnected at positions where the conductive section extending horizontally intersects the conductive section extending vertically; and simultaneously filling the second groove with the conductive material to form the lead 3;

Step S3, referring to FIG. 18b, providing insulating portions 5 distributed and covering the positions where the conductive sections 2 extending vertically and the conductive sections 2 extending horizontally intersect each other; and Step S4, referring to FIG. 18c, forming the bridging portion 4 form the bridging portion 4 by the silk screen printing, the two ends of the bridging portion 4 being electrically connected to the conductive section 2 and the lead 3, respectively; and forming a second bridging portion 6 on the insulating portion 5, the second bridging portion 6 electrically connecting the disconnected portions of the conductive section 2.

The above steps S3 and S4 can be formed at the same time, and the bridging portion 4 and the second bridging portion 6 are formed at the same time.

The conductive film is embossed and filled at the same time to form the conductive section and the lead, and then the silk screen printing is performed to form the bridging portion that electrically connects the conductive section with the lead. In this regard, the method is simple in processes, environmental friendly and can achieve excellent electrical performance. The conductive film can be used in various fields such as liquid crystal displays, touch panels, electromagnetic wave protection, solar electromagnetic electrodes, heating films, shielding films, OLED displays or OLED light emitters.

The embodiments of the present disclosure are described in detail above with reference to the accompanying drawings, for the purposes of explaining the above objectives, features, and advantages of the present disclosure. In the above description, many specific details are explained in order to fully understand the present disclosure. However, the present disclosure can be implemented in many ways other than those described above. Those skilled in the art can make similar improvements without contradicting the connotation of the present disclosure. Therefore, the present disclosure is not limited by the specific embodiments disclosed above. Moreover, the technical features of the above-mentioned embodiments can be combined arbitrarily. For the concise reason, all possible combinations of the various technical features in the above-mentioned embodiments are not described. However, as long as the technical features are not contradictory to each and cannot be combined, all the combinations should be considered within the scope of this specification.

The above are merely several embodiments of the present disclosure, and the description is specific and detailed, but it should not be understood as a limitation of the scope of the present disclosure. It should be pointed out that those skilled in the art can make various modifications and improvements without departing from the concept of the present disclosure, which shall all fall within the protection scope of the present disclosure. The scope of protection of the present disclosure patent shall be determined by the appended claims.

What is claimed is:

1. A conductive film, comprising:
   a carrier layer comprising a first side surface and a second side surface that are opposite to each other, wherein the first side surface of the carrier layer is recessed to form a first groove and a second groove that are not in communication with each other;
   a conductive section formed by a conductive material filled in the first groove;
   a lead formed by a conductive material filled in the second groove; and
   a bridging portion arranged on the first side surface and configured to electrically connect the conductive section with the lead,
   wherein the bridging portion itself is located in a same film layer, and
   wherein the bridging portion is in electrical contact with the lead, and the bridging portion and the lead are located in different film layers,
   wherein the conductive section comprises first grids connected to each other, the lead comprises second grids connected to each other, and the bridging portion electrically connects the first grids with the second grids,
   wherein the conductive film comprises a plurality of conductive sections extending vertically and a plurality of conductive sections extending horizontally, the conductive section being one of the plurality of vertically extending sections or one of the plurality of horizontally extending sections; and
   wherein each the plurality of conductive sections extending horizontally is disconnected at positions where the conductive section extending horizontally intersects the plurality of conductive sections extending vertically, and disconnected portions of each of the plurality of conductive sections extending horizontally are electrically connected to each other via a second bridging portion.

2. The conductive film according to claim 1, wherein the bridging portion is formed on the first side surface by silk screen printing, inkjet printing, sputtering or evaporation.

3. The conductive film according to claim 1, wherein the bridging portion comprises a bottom surface facing towards the first side surface, and the bottom surface is in a partial contact with the first side surface.

4. The conductive film according to claim 1, wherein the bridging portion and a corresponding conductive section are electrically connected through at least one of a point-to-point connection, a point-to-line connection, a point-to-surface connection, a line-to-line connection, a line-to-surface connection, or a surface-to-surface connection; and the bridging portion and a corresponding lead are electrically connected through at least one of a point-to-point connection, a point-to-line connection, a point-to-surface connection, a line-to-line connection, a line-to-surface connection, or a surface-to-surface connection.

5. The conductive film according to claim 1, wherein a width of the first groove is greater than a width of the second groove; and/or, a depth of the second groove is greater than a depth of the first groove.

6. The conductive film according to claim 5, wherein an opening of the first groove located on the first side surface has a greater width than a bottom of the first groove; and/or, an opening of the second groove located on the first side surface has a greater width than a bottom of the second groove.

7. The conductive film according to claim 6, wherein the first groove comprises a first bottom wall and two first side walls respectively connecting two sides of the first bottom wall, and at least one of the first bottom wall and the two first side walls is an arcuate wall; and/or, the second groove comprises a second bottom wall and two second side walls respectively connecting two sides of the second bottom wall, and at least one of the second bottom wall and the two second side walls is an arcuate wall.

8. The conductive film according to claim 1, wherein the bridging portion comprises a plurality of connection points, and each of the plurality of connection points connects at least one grid line of one of the first grids with at least one grid line of one of the second grids.

9. The conductive film according to claim 1, wherein the bridging portion is linear, grid lines of the first grids extend to the bridging portion, and grid lines of second grids extend to the bridging portion.

10. The conductive film according to claim 1, wherein the bridging portion is block-shaped, and the block-shaped bridging portion partially covers grid lines of one of the first grids and partially covers grid lines of one of the second grids.

11. The conductive film according to claim 1, wherein the bridging portion comprises third grids, the third grids extend to the first grids and are in electrical contact with the first grids, and the third grids extend to the second grids and are in electrical contact with the second grids.

12. The conductive film according to claim 1, wherein the bridging portion comprises a plurality of strip-shaped bridging parts, and each of the plurality of strip-shaped bridging parts has one end connected to one of the first grids and another end connected to one of the second grids.

13. The conductive film according to claim 1, wherein the conductive section is one of a plurality of conductive sections of the conductive film that are not connected to each other, and each of the plurality of conductive sections is electrically connected to a corresponding the lead through a corresponding the bridging portion.

* * * * *